US008773328B2

(12) United States Patent
Allen et al.

(10) Patent No.: US 8,773,328 B2
(45) Date of Patent: Jul. 8, 2014

(54) INTELLIGENT DMA IN A MOBILE MULTIMEDIA PROCESSOR SUPPORTING MULTIPLE DISPLAY FORMATS

(75) Inventors: Stephen R. Allen, Great Shelford (GB); Gary C. Keall, Long Clawson (GB)

(73) Assignee: Broadcom Corporation, Irvine, CA (US)

( * ) Notice: Subject to any disclaimer, the term of this patent is extended or adjusted under 35 U.S.C. 154(b) by 1076 days.

(21) Appl. No.: 11/318,980

(22) Filed: Dec. 27, 2005

(65) Prior Publication Data

US 2006/0184987 A1 Aug. 17, 2006

Related U.S. Application Data

(60) Provisional application No. 60/652,430, filed on Feb. 12, 2005.

(51) Int. Cl.
*G09G 5/00* (2006.01)
*G09G 5/36* (2006.01)

(52) U.S. Cl.
USPC .............................. 345/3.1; 345/1.1; 345/547

(58) Field of Classification Search
USPC .................. 345/1.1, 3.1, 501, 519, 530, 531, 345/545–547
See application file for complete search history.

(56) References Cited

U.S. PATENT DOCUMENTS

| 4,775,859 | A | * | 10/1988 | Starkey et al. | 345/13 |
| 5,694,141 | A | * | 12/1997 | Chee | 345/3.1 |
| 5,841,430 | A | * | 11/1998 | Kurikko | 345/213 |
| 5,963,192 | A | | 10/1999 | Wong et al. | |
| 6,189,064 | B1 | * | 2/2001 | MacInnis et al. | 710/244 |
| 6,310,921 | B1 | * | 10/2001 | Yoshioka et al. | 375/240.26 |
| 6,323,868 | B1 | * | 11/2001 | Paluch et al. | 345/572 |
| 6,944,682 | B2 | * | 9/2005 | Tanaka | 710/22 |
| 7,110,663 | B1 | * | 9/2006 | Tsukagoshi et al. | 386/356 |
| 2002/0118296 | A1 | | 8/2002 | Schwab et al. | |
| 2004/0055011 | A1 | | 3/2004 | Bae et al. | |
| 2004/0075664 | A1 | * | 4/2004 | Law et al. | 345/530 |
| 2005/0066205 | A1 | * | 3/2005 | Holmer | 713/320 |

FOREIGN PATENT DOCUMENTS

EP 0 802 519 10/1997

OTHER PUBLICATIONS

European Search Report corresponding to European Patent Application No. 06001038.6-1228, dated Mar. 9, 2010.

* cited by examiner

*Primary Examiner* — Joni Richer
(74) *Attorney, Agent, or Firm* — Brinks Gilson & Lione

(57) ABSTRACT

Methods and systems for processing video data are disclosed herein and may include determining a first video format associated with video data to be displayed on a first video display communicatively coupled to a single mobile multiple media processor that supports a plurality of display formats. The single mobile multiple media processor may be integrated within a mobile device. An amount of the video data that is transferred from memory to the first video display, by a DMA controller, may be restricted based on the determined first video format associated with the video data to be displayed on a first video display. Only the restricted amount of the video data that is to be displayed by the first video display may be transferred from the memory to the first video display by the DMA controller.

22 Claims, 8 Drawing Sheets

INTELLIGENT DMA IN A MOBILE MULTIMEDIA PROCESSOR SUPPORTING MULTIPLE DISPLAY FORMATS

CROSS-REFERENCE TO RELATED APPLICATIONS/INCORPORATION BY REFERENCE

This application makes reference, claims priority to, and claims the benefit of U.S. Provisional Application Ser. No. 60/652,430 filed Feb. 12, 2005.

This application also makes reference to:
U.S. application Ser. No. 11/302,930 filed Dec. 14, 2005; and
U.S. application Ser. No. 11/300,388 filed Dec. 14, 2005, which has now issued as U.S. Pat. No. 7,395,385.

Each of the above stated applications is hereby incorporated herein by reference in its entirety.

FIELD OF THE INVENTION

Certain embodiments of the invention relate to mobile multimedia communication. More specifically, certain embodiments of the invention relate to intelligent direct memory access (DMA) in a mobile multimedia processor supporting multiple display formats.

BACKGROUND OF THE INVENTION

Mobile communications have changed the way people communicate and mobile phones have been transformed from a luxury item to an essential part of every day life. The use of mobile phones today is dictated by social situations, rather than hampered by location or technology. While voice connections fulfill the basic need to communicate, and mobile voice connections continue to filter even further into the fabric of every day life, various integrated mobile multimedia applications, utilizing the mobile Internet, is the next step in the mobile communication revolution.

Third generation (3G) cellular networks offering various high speed access technologies and mobile telephones that have been specifically designed to utilize these technologies, fulfill demands for integrated multimedia applications supporting TV and audio applications utilizing advanced compression standards, high-resolution gaming applications, musical interfaces, peripheral interface support, etc. The processing requirements are being increased as chip designers take advantage of compression and higher bandwidths to transmit more information. 3G wireless applications support bit rates from 384 kilobits (Kbits)/second to 2 megabits (Mbits)/second, allowing chip designers to provide wireless systems with multimedia capabilities, superior quality, reduced interference, and a wider coverage area.

As mobile multimedia services grow in popularity and usage, factors such as power consumption, cost efficient optimization of network capacity and quality of service (QoS) will become even more essential to cellular operators than it is today. These factors may be achieved with careful network planning and operation, improvements in transmission methods, and advances in receiver techniques and chip integration solutions. To this end, carriers need technologies that will allow them to increase downlink throughput for the mobile multimedia applications support and, in turn, offer advanced QoS capabilities and speeds for consumers of mobile multimedia application services. Currently, mobile multimedia processors don't fully exploit system-on-a-chip (SOC) integration for advanced total system solution for today's mobile handsets. For example, conventional mobile processors may utilize a plurality of hardware accelerators to enable a variety of multimedia applications, which significantly increases power consumption, implementation complexity, mobile processor real estate, and ultimately terminal size.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for intelligent direct memory access (DMA) in a mobile multimedia processor supporting multiple display formats, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for intelligent direct memory access (DMA) in a mobile multimedia processor supporting multiple display formats. In one embodiment of the invention, memory access functionality through an intelligent direct memory access (DMA) controller may be provided in a video core integrated within a mobile device such as a cellular telephone, a PDA, or any handheld communication device. More specifically, an intelligent DMA controller may be adapted to access decoded video information stored in on-chip memory and recognize an entire pixel line from the stored video information. A display controller may be utilized to communicate decoded video information accessed via the intelligent DMA controller to one or more video display devices. The display controller may be adapted to support, for example, interlaced and non-interlaced display devices. In this regard, if information is communicated to an interlaced video display, such as a TV, the display controller may be adapted to instruct the intelligent DMA to initially read and communicate decoded video information from odd-numbered lines, followed by video information from even-numbered lines.

In a somewhat similar manner, if information is communicated to a non-interlaced video display, such as an LCD, the display controller may be adapted to instruct the intelligent DMA to read and communicate decoded video information from sequentially numbered lines. By utilizing an intelligent DMA controller that may be adapted to recognize pixel line boundaries, processing speed may be significantly increased since only desired video data is communicated to an interlaced and/or non-interlaced display device, and no acquired data is thrown away. The DMA controller may also be adapted to skip a line or go forward a line, as instructed by a display controller. Furthermore, the intelligent DMA controller may allow increased processing speed during video scaling, where the current pixel line may be acquired and utilized several times, or during zooming, where a previous pixel line may be acquired and utilized several times. The intelligent DMA controller may enable single memory storage for video information for both interlaced and non-interlaced displays. An interlaced display may be enabled without requiring a frame (or pixel line) to be fetched twice, throwing every other line away, or that odd lines and even lines be stored in separate memory modules.

Figure 1A:
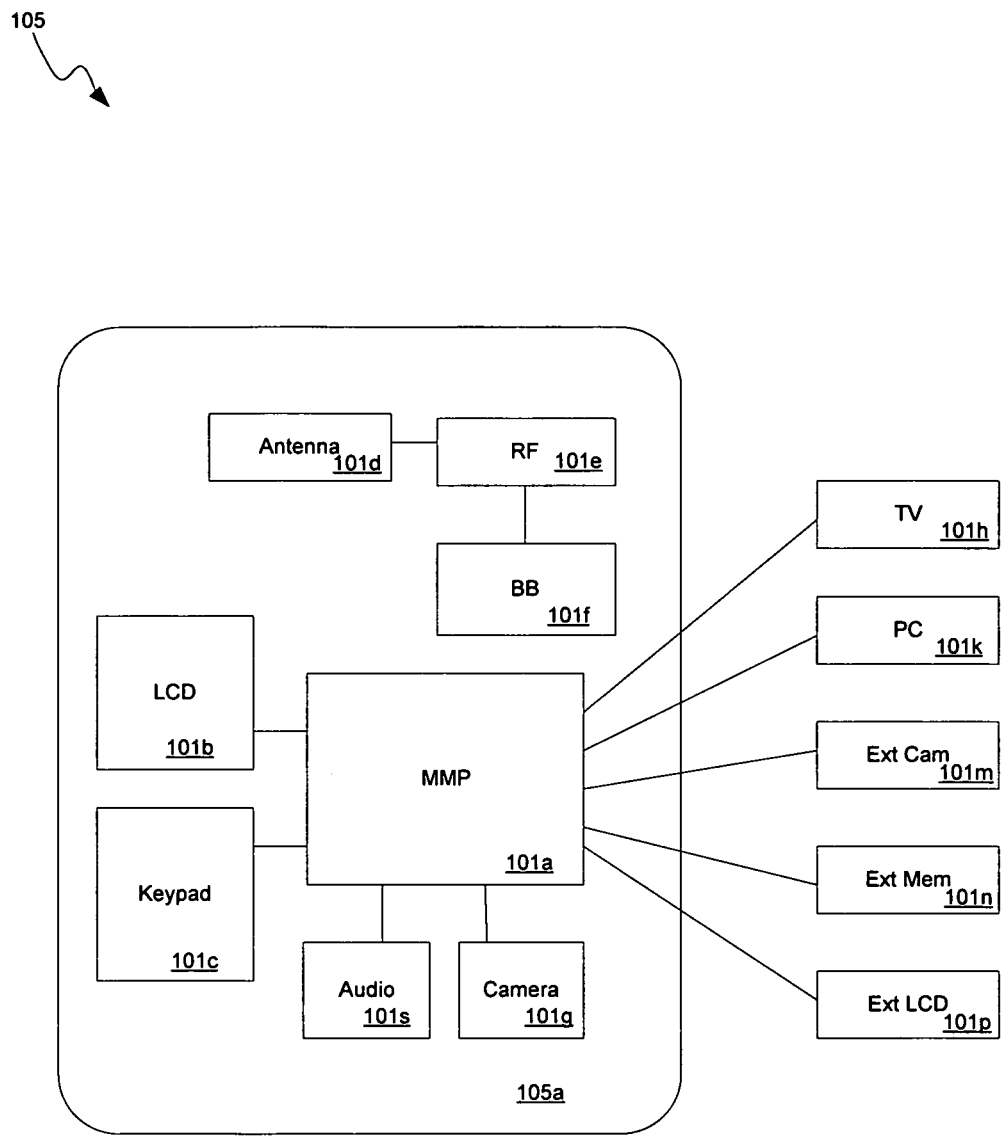
FIG. 1A is a block diagram of an exemplary mobile multimedia system, in accordance with an embodiment of the invention.

FIG. 1A is a block diagram of an exemplary mobile multimedia system, in accordance with an embodiment of the invention. Referring to FIG. 1A, there is shown a mobile multimedia system 105 that comprises a mobile multimedia device 105a, a TV 101h, a PC 101k, an external camera 101m, external memory 101n, and external LCD display 101p. The mobile multimedia device 105a may be a cellular telephone or other handheld communication device. The mobile multimedia device 105a may comprise a mobile multimedia processor (MMP) 101a, an antenna 101d, an audio block 101s, a radio frequency (RF) block 101e, a baseband processing block 101f, an LCD display 101b, a keypad 101c, and a camera 101g.

The MMP 101a may comprise suitable circuitry, logic, and/or code and may be adapted to perform video and/or multimedia processing for the mobile multimedia device 105a. The MMP 101a may further comprise a plurality of integrated interfaces, which may be utilized to support one or more external devices coupled to the mobile multimedia device 105a. For example, the MMP 101a may support connections to a TV 101h, a PC 101k, an external camera 101m, external memory 101n, and an external LCD display 101p.

In operation, the mobile multimedia device may receive signals via the antenna 101d. Received signals may be processed by the RF block 101e and the RF signals may be converted to baseband by the baseband processing block 101f. Baseband signals may then be processed by the MMP 101a. Audio and/or video signals may also be received via the integrated camera 101g, the TV 101h, the PC 101k, and/or the external camera 101m. During processing, the MMP 101a may utilize the external memory 101n for storing of processed data. Processed audio data may be communicated to the audio block 101s and processed video data may be communicated to the LCD 101b or the external LCD 101p, for example. The keypad 101c may be utilized for communicating processing commands and/or other data, which may be required for audio or video data processing by the MMP 101a.

Figure 1B:
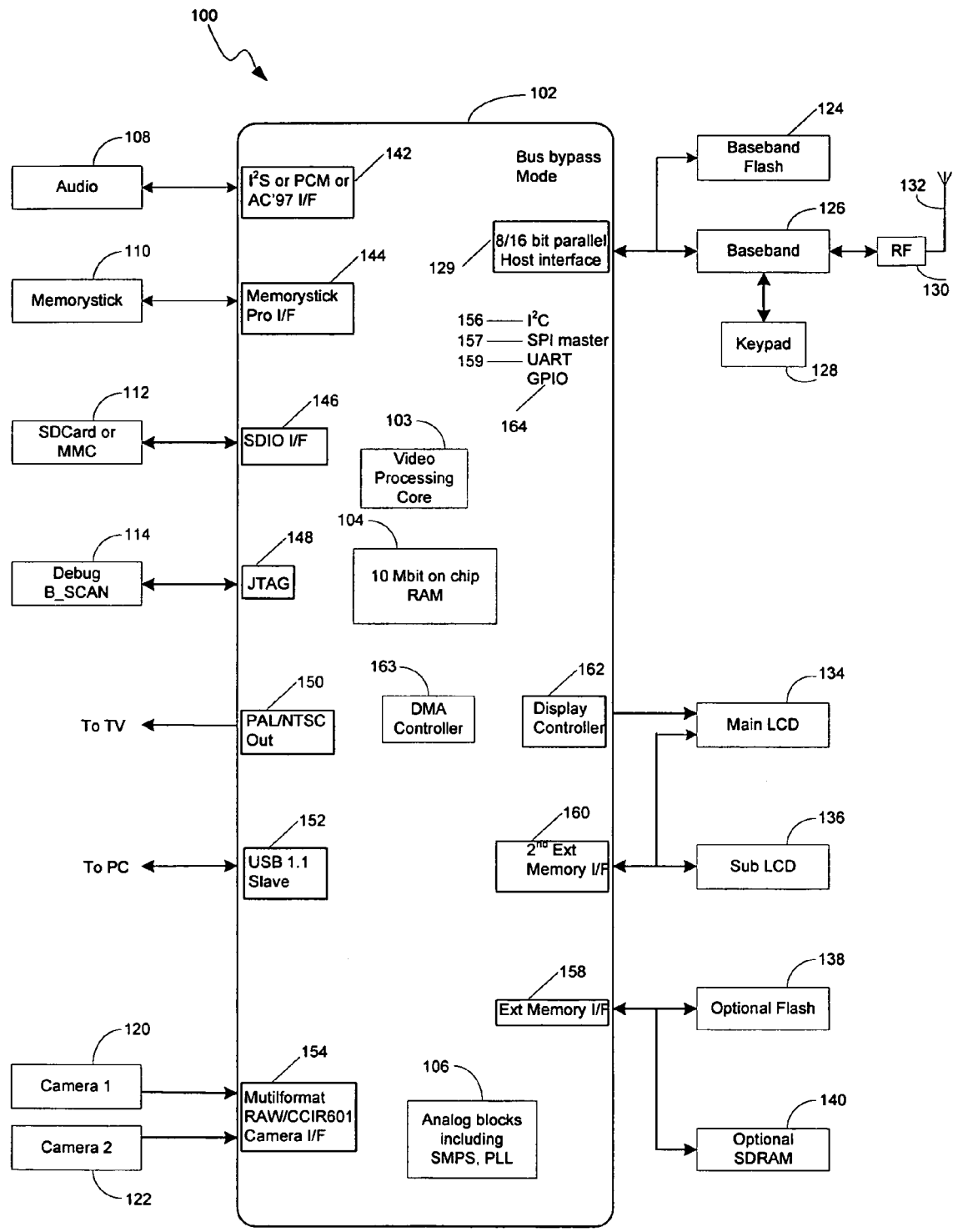
FIG. 1B is a block diagram of an exemplary mobile multimedia processor, in accordance with an embodiment of the invention.

FIG. 1B is a block diagram of an exemplary mobile multimedia processor, in accordance with an embodiment of the invention. Referring to FIG. 1B, the mobile multimedia processor 102 may comprise suitable logic, circuitry and/or code that may be adapted to perform video and/or multimedia processing for handheld multimedia products. For example, the mobile multimedia processor 102 may be designed and optimized for video record/playback, mobile TV and 3D mobile gaming, utilizing integrated peripherals and a video processing core. The mobile multimedia processor 102 may comprise a video processing core 103, RAM 104, an analog block 106, a direct memory access (DMA) controller 163, an audio interface (I/F) 142, a memory stick I/F 144, SD card I/F 146, JTAG I/F 148, TV output I/F 150, USB I/F 152, a camera I/F 154, a host I/F 129, and an integrated-integrated circuit ($I^2C$) I/F 156. The mobile multimedia processor 102 may further comprise a serial peripheral interface (SPI) 157, a universal asynchronous receiver/transmitter (UART) I/F 159, general purpose input/output (GPIO) pins 164, a display controller 162, an external memory I/F 158, and a second external memory I/F 160.

The video processing core 103 may comprise suitable circuitry, logic, and/or code and may be adapted to perform video processing of data. The RAM 104 may comprise suitable logic, circuitry and/or code that may be adapted to store on-chip data such as video data. In an exemplary embodiment of the invention, the RAM 104 may be adapted to store 10 Mbits of on-chip data, for example. The size of the on-chip RAM 104 may vary depending on cost or other factors such as chip size.

The analog block 106 may comprise a switch mode power supply (SMPS) block and a phase locked loop (PLL) block. In addition, the analog block 106 may comprise an on-chip SMPS controller, which may be adapted to generate its core voltage. The core voltage may be software programmable according to, for example, speed demands on the mobile multimedia processor 102, allowing further control of power management.

In an exemplary embodiment of the invention, the normal core operating range may be about 0.8 V-1.2 V and may be reduced to about 0.6 V during hibernate mode. The analog block 106 may also comprise a plurality of PLL's that may be adapted to generate about 195 kHz-200 MHz clocks, for example, for external devices. Other voltages and clock speeds may be utilized depending on the type of application. The mobile multimedia processor 102 may comprise a plurality of power modes of operation, for example, run, sleep, hibernate and power down. In accordance with an embodiment of the invention, the mobile multimedia processor 102 may comprise a bypass mode that may allow a host to access memory mapped peripherals in power down mode, for example. In bypass mode, the mobile multimedia processor 102 may be adapted to directly control the display during normal operation while giving a host the ability to maintain the display during standby mode.

The audio block 108 may comprise suitable logic, circuitry and/or code that may be adapted to communicate with the mobile multimedia processor 102 via an inter-IC sound ($I^2S$), pulse code modulation (PCM) or audio codec (AC'97) interface 142 or other suitable interface, for example. In the case of an AC'97 and/or an $I^2S$ interface, suitable audio controller, processor and/or circuitry may be adapted to provide AC'97 and/or $I^2S$ audio output respectively, in either master or slave mode. In the case of the PCM interface, a suitable audio controller, processor and/or circuitry may be adapted to allow input and output of telephony or high quality stereo audio. The PCM audio controller, processor and/or circuitry may comprise independent transmit and receive first in first out (FIFO) buffers and may use DMA to further reduce processor overhead. The audio block 108 may also comprise an audio in, audio out port and a speaker/microphone port (not illustrated in FIG. 1B).

The mobile multimedia device 100 may comprise at least one portable memory input/output (I/O) block. In this regard, the memorystick block 110 may comprise suitable logic, circuitry and/or code that may be adapted to communicate with the mobile multimedia processor 102 via a memorystick pro interface 144, for example. The SD card block 112 may comprise suitable logic, circuitry and/or code that may be adapted to communicate with the mobile multimedia processor 102 via a SD input/output (I/O) interface 146, for example. A multimedia card (MMC) may also be utilized to communicate with the mobile multimedia processor 102 via the SD input/output (I/O) interface 146, for example. The mobile multimedia device 100 may comprise other portable memory I/O blocks such an xD I/O card.

The debug block 114 may comprise suitable logic, circuitry and/or code that may be adapted to communicate with the mobile multimedia processor 102 via a joint test action group (JTAG) interface 148, for example. The debug block 114 may be adapted to access the address space of the mobile multimedia processor 102 and may be adapted to perform boundary scan via an emulation interface. Other test access ports (TAPs) may be utilized. The phase alternate line (PAL)/national television standards committee (NTSC) TV output I/F 150 may be utilized for communication with a TV, and the universal serial bus (USB) 1.1, or other variant thereof, slave port I/F 152 may be utilized for communications with a PC, for example. The cameras 120 and/or 122 may comprise suitable logic, circuitry and/or code that may be adapted to communicate with the mobile multimedia processor 102 via a multiformat raw CCIR 601 camera interface 154, for example. The camera I/F 154 may utilize windowing and sub-sampling functions, for example, to connect the mobile multimedia processor 102 to a mobile TV front end.

The mobile multimedia processor 102 may also comprise a plurality of serial interfaces, such as the USB I/F 152, an inter-integrated circuit (I²C) master I/F 156, a serial peripheral interface (SPI) 157, and a universal asynchronous receiver/transmitter (UART) I/F 159 for Bluetooth or IrDA. The I²C master interface 156 may comprise suitable circuitry, logic, and/or code and may be adapted to control image sensors and may be a connected to smart batteries and other peripherals. The SPI master interface 157 may comprise suitable circuitry, logic, and/or code and may be utilized to control image sensors. Two chip selects may be provided, for example, to work in a polled mode with interrupts or via a DMA controller 163. Furthermore, the mobile multimedia processor 102 may comprise a plurality of general purpose I/O (GPIO) pins 164, which may be utilized for user defined I/O or to connect to the internal peripherals. The display controller 162 may comprise suitable circuitry, logic, and/or code and may be adapted to support multiple displays with XGA resolution, for example, and to handle 8/9/16/18/21-bit video data.

The baseband flash memory 124 may be adapted to receive data from the mobile multimedia processor 102 via an 8/16 bit parallel host interface 129, for example. The host interface 129 may be adapted to provide two channels with independent address and data registers through which a host processor may read and/or write directly to the memory space of the mobile multimedia processor 102. The baseband processing block 126 may comprise suitable logic, circuitry and/or code that may be adapted to convert RF signals to baseband and communicate the baseband processed signals to the mobile multimedia processor 102 via the host interface 129, for example. The RF processing block 130 may comprise suitable logic, circuitry and/or code that may be adapted to receive signals via the antenna 132 and to communicate RF signals to the baseband processing block 126. The host interface 129 may comprise a dual software channel with a power efficient bypass mode.

The main LCD 134 may be adapted to receive data from the mobile multimedia processor 102 via a display controller 162 and/or from a second external memory interface 160, for example. The display controller 162 may comprise suitable logic, circuitry and/or code and may be adapted to drive an internal TV out function or be connected to a range of LCD's. The display controller 162 may be adapted to support a range of screen buffer formats and may utilize direct memory access (DMA) to access the buffer directly and increase video processing efficiency of the video processing core 103. Both NTSC and PAL raster formats may be generated by the display controller 162 for driving the TV out. Other formats, for example SECAM, may also be supported In one embodiment of the invention, the display controller 162 may be adapted to support a plurality of displays, such as an interlaced display, for example a TV, and/or a non-interlaced display, such as an LCD. The display controller 162 may also recognize and communicate a display type to the DMA controller 163. In this regard, the DMA controller 163 may be fetch video data in an interlaced or non-interlaced fashion for communication to an interlaced or non-interlaced display coupled to the mobile multimedia processor 102 via the display controller 162.

The substitute LCD 136 may comprise suitable logic, circuitry and/or code that may be adapted to communicate with the mobile multimedia processor 102 via a second external memory interface, for example. The mobile multimedia processor 102 may comprise a RGB external data bus. The mobile multimedia processor 102 may be adapted to scale image output with pixel level interpolation and a configurable refresh rate.

The optional flash memory 138 may comprise suitable logic, circuitry and/or code that may be adapted to communicate with the mobile multimedia processor 102 via an external memory interface 158, for example. The optional SDRAM 140 may comprise suitable logic, circuitry and/or code that may be adapted to receive data from the mobile multimedia processor 102 via the external memory interface 158, for example. The external memory I/F 158 may be utilized by the mobile multimedia processor 102 to connect to external SDRAM 140, SRAM, Flash memory 138, and/or external peripherals, for example. Control and timing information for the SDRAM 140 and other asynchronous devices may be configurable by the mobile multimedia processor 102.

The mobile multimedia processor 102 may further comprise a secondary memory interface 160 to connect to connect to memory-mapped LCD and external peripherals, for example. The secondary memory interface 160 may comprise suitable circuitry, logic, and/or code and may be utilized to connect the mobile multimedia processor 102 to slower devices without compromising the speed of external memory access. The secondary memory interface 160 may provide 16 data lines, for example, 6 chip select/address lines, and programmable bus timing for setup, access and hold times, for example. The mobile multimedia processor 102 may be adapted to provide support for NAND/NOR Flash including NAND boot and high speed direct memory access (DMA), for example.

In operation, the mobile multimedia processor 102 may be adapted to support multiple display formats for displaying processed video data. For example, interlaced and/or non-interlaced external displays may be connected to the mobile multimedia processor 102 via the display controller 162. The display controller 162 may communicate the external display type to the DMA controller 163. The DMA controller 163 may then access the on-chip RAM 104 and may fetch processed video data in an interlaced or non-interlaced format, corresponding to the external display type.

Figure 1C:
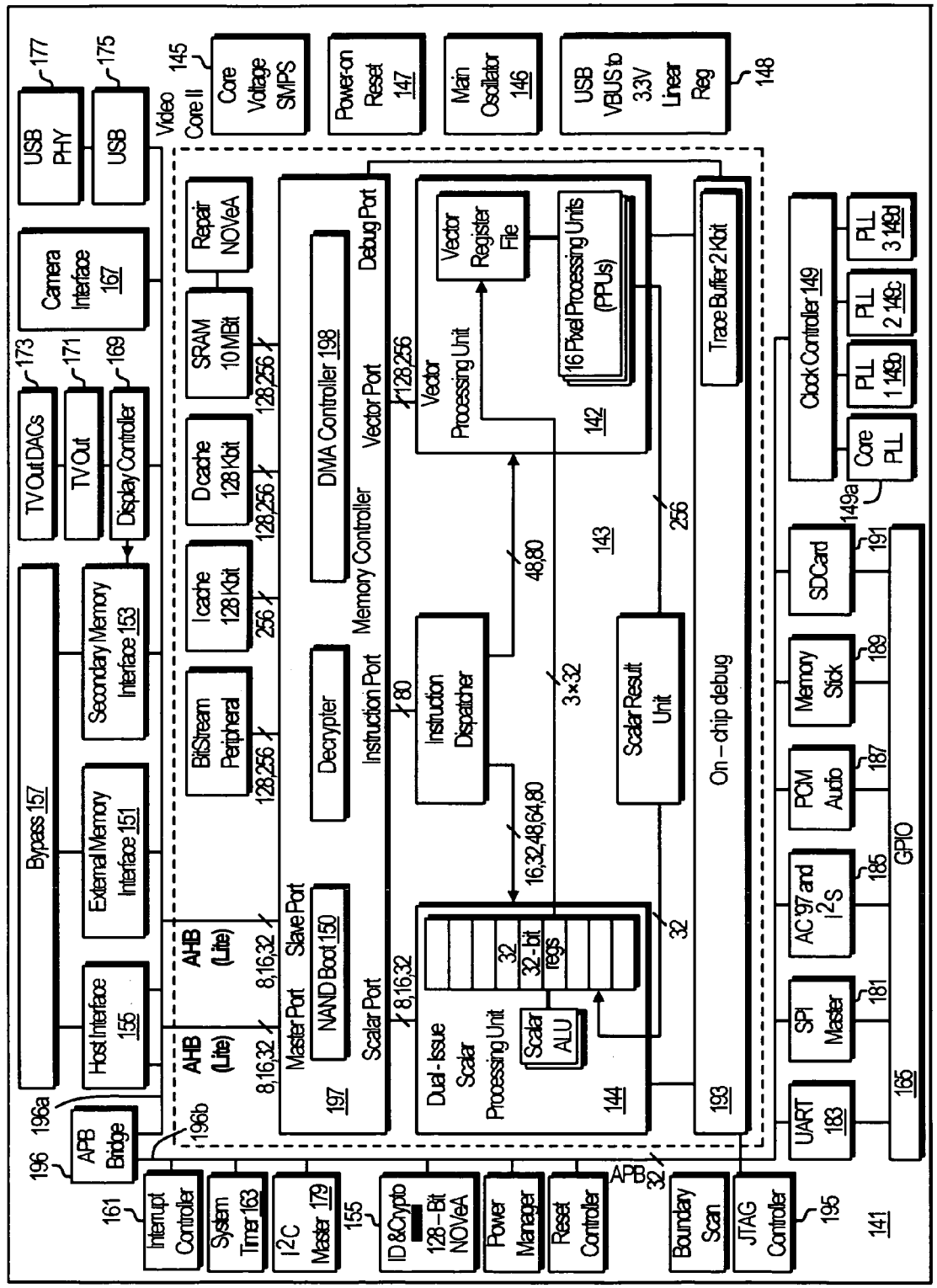
FIG. 1C is a functional block diagram of an exemplary multimedia processor with integrated peripherals that may be utilized in accordance with an embodiment of the invention.

FIG. 1C is a functional block diagram of an exemplary mobile multimedia processor with integrated peripherals that may be utilized in accordance with an embodiment of the invention. Referring to FIG. 1C, the mobile multimedia processor 141 may comprise a processor core 143, a core voltage switch mode power supply (SMPS) 145, a USB linear regulator 148, a main oscillator 146, a reset controller 147, a clock controller 149, phase locked loop (PLL) modules 149a, ..., 149d, an external memory interface 151, a secondary memory interface 153, a host interface 155, bypass logic 157, ID and cryptography module 159, and interrupt controller 161. The mobile multimedia processor 141 may further comprise a system timer 163, general purpose I/O (GPIO) module 165, camera interface 167, display controller 169, TV output interface 171, TV output converter 173, USB interface 175, USB physical (PHY) layer interface 177, inter-integrated circuit (I²C) controller 179, serial peripheral interface (SPI) 181, and universal asynchronous receiver/transmitter (UART) interface 183. The mobile multimedia processor 141 may also comprise Audio Codec '97 (AC'97) and inter-IC sound (I²S) controller 185, pulse code modulation (PCM) audio interface 187, memory stick interface 189, SD card interface 191, Joint Test Action Group (JTAG) controller 195, peripheral bus 196, advanced high-performance bus (AHB) 196a, and advanced peripheral bus (APB) 196b. The processor core 143 may comprise a memory controller 197, on-chip debug module 193, a vector processing unit 142, and a scalar processing unit 144. The memory controller 197 may comprise a NAND boot module 150 and a direct memory access (DMA) controller 198.

The processor core 143 may be adapted to process applications built on 2-D representations of data, such as image processing. Image-processing tasks within the processing core 143 may be partitioned across the scalar processing unit 144 and/or the vector processing unit 142, which may allow the processor core 143 to operate at clock speeds of up to 150 MHz. The scalar processing unit 144 may be adapted to execute two scalar instructions per cycle. Branch prediction logic may also be utilized to minimize pipeline stalls. Furthermore, the processor core 143 may utilize a backward-compatible instruction set, as well as new instructions allowing for 32-bit audio support.

The core voltage SMPS 145 may comprise suitable circuitry, logic, and/or code and may be utilized to generate voltage for the processor core 143 within the mobile multimedia processor 141. The voltage may be software programmable according to speed demands of the chip, allowing further control of power management. The core operating range may be from about 0.8V to 1.2V, for example, and may be reduced to 0.6V in HIBERNATE mode. The processor core 143 may be adapted to control the output voltage of the on-chip power supply 145, thus reducing power consumption when the mobile multimedia processor 141 is not running at maximum speed. The core voltage supplied by the SMPS 145 may be independently set for when the processor core 143 is running (or asleep), and when hibernating. In RUN mode, for example, the core voltage may be adjusted between 0.8V and 1.2V to meet performance/power-saving requirements. In HIBERNATE mode, the core voltage may be reduced to 0.6V, for example, to minimize power consumption without losing state. Both voltages may be initialized to 1.2V on power-up and after a reset. If the core voltage is changed, a "watchdog" module may be utilized to recover from failure and clock speed within the mobile multimedia processor 141 may be reduced so that the processor core 143 may cope with the lower voltage.

The USB linear regulator 148 may comprise suitable circuitry and/or logic and may be adapted to generate supply voltage, such as 3.3V, for the USB PHY layer interface 177 from the 5V USB VBUS supply.

The reset controller 147 may comprise a boot controller and/or a power-on-reset cell. Following reset, the boot controller may examine the pin configuration within the mobile multimedia processor 141 to determine a required mode and may control the internal memory BIST/BISR and external Flash boot as may be required.

The clock controller 149 may comprise suitable circuitry and/or logic and may be adapted to coordinate four PLL modules 149a, ..., 149d and to generate clocks for the processor core 143 and/or for the peripherals. The clock controller 149 may utilize the PLL modules 149a, ..., 149d and/or additional independent divider circuits to allow a wide range of clocks to be generated, allowing the peripherals within the mobile multimedia processor 141 to be driven by an appropriate frequency while only requiring a single external crystal, or clock source. The core clock may be driven from the main oscillator 146 (normally 13.5 MHz, for example) on power-up and may subsequently be switched to the core PLL 149a after the core PLL 149a has been enabled.

The core PLL 149a may comprise suitable circuitry, logic, and/or code and may be utilized to adjust the core clock frequency to meet performance and/or power consumption requirements. In addition to the core PLL 149a, the remaining PLL modules 149b, 149c, and 149ds may be utilized to allow a wide range of independent clock frequencies to be generated for use by the various peripherals. Further, the clock controller 149 may supply independent clocks for the frequency-critical peripherals, such as camera, LCD, automatic customer/caller identification system (ACIS), PCM, universal serial bus (USB), and/or removable memory devices. The clock manager 149 may also supply a general-purpose clock (GENCLK) that may be supplied to the output on the GPIO interface 165. Each clock may be derived from the main oscillator 146 and/or from one of the three PLL modules 149b, 149c, 149d. The core PLL 149a may also be selected as the clock source.

The main oscillator 146 may be adapted to support crystal frequencies up to 27 MHz, for example. The internal PLL modules 149a, ..., 149d may be utilized to produce the desired core clock frequency. The oscillator 146 may also be driven with a digital clock signal. When using an external clock source within the mobile multimedia processor 141, input frequencies up to 35 MHz may be supported.

The external memory interface 151 may comprise suitable circuitry and/or logic and may allow connection of 16-bit or 32-bit SDRAM, and/or asynchronous memory devices, to the mobile multimedia processor 141. Control and timing information for both the SDRAM and the asynchronous memories may be fully configurable by the processor core 143. The memory interface 151 may be adapted to work at either core frequency or half core frequency up to 85 MHz, for example. External direct memory access (DMA) may be also supported via the DMA controller 198.

The NAND boot module 150 may comprise suitable circuitry and/or logic and may be designed to load a boot program into internal SRAM and then wake up the processor from sleep. The boot code may be stored in consecutive pages of NAND flash memory, with the first page being on a 16 kbyte address boundary within the first 128 kbytes, for example. The first 16-bits of the boot code may comprise a signature word, for example. The next 16-bits may comprise the size of the boot executable in 32-bit words, followed by the boot executable itself. To protect against data corruption in the boot code, each word of the boot code may be repeated.

The secondary memory interface 153 may comprise suitable circuitry and/or logic and may allow slower devices to be connected without compromising the speed of external memory access. The secondary memory interface 153 may comprise 16 data lines and six chipselect/address lines. In addition, the secondary memory interface 153 may comprise programmable bus timing for setup, access, and/or hold times. Alternatively, these pins may be used to connect to an LCD, for example.

The host interface 155 may comprise suitable circuitry and/or logic and may provide two channels with independent address and data registers through which a host processor may read or write directly to the address space of the mobile multimedia processor 141. FIFOs and an auto-incrementing address mode may be utilized for efficient transfer of large blocks of data. The host interface 155 allows the mobile multimedia processor 141 to be used as a coprocessor to a main system processor, for example. The host interface 155 may be connected to the host processor's main bus.

The bypass logic 157 may be utilized by the host processor to access the external and secondary memory interfaces, for example, while the processor core 143 is powered down. In this regard, the mobile multimedia processor 141 may directly control the display during normal operation while still giving the host the ability to maintain the display during system standby. As there is no clock to the mobile multimedia processor 141 in this mode, all timing may be driven from the host bus signals.

The ID and cryptography module 159 may comprise suitable circuitry and/or logic and may be utilized to support digital rights management and to allow the mobile multimedia processor 141 to securely execute encrypted code.

The interrupt controller 161 may comprise suitable circuitry and/or logic and may be adapted to support 32 hardware interrupt sources, for example. Each source may be assigned to one of seven priority levels, for example, or may be masked. The interrupt controller 161 may generate a global interrupt signal and/or a 5-bit vector identifying the specific interrupt number. Dedicated DMA-based peripherals, such as the display controller 169 and camera interface 167, may rely on the DMA controller 198 to generate an interrupt, if processor action is required. Other peripherals, such as the UART 183, SPI 181, removable memory device, and/or AC'97/I2S controller 185 may generate their own interrupts, which may feed directly into the interrupt controller 161.

The system timer peripheral 163 may provide four timer channels running off a single free running counter. Each channel may comprise an output compare register that may be used to generate an interrupt.

The GPIO module 165 may comprise a plurality of general-purpose I/O pins. The pins may be used either for user defined I/O, or to connect to the internal peripherals. The GPIO pins may be split across two banks, which may be operated at different supply voltages. Most of the peripheral functions may be replicated in both banks for flexibility. When operating as GPIO, each pin may be configured as input, output or bi-directional, may comprise a configurable pull-up or pull-down resistor, and may be adapted to generate an edge or level triggered interrupt.

The camera interface 167 may be connected to two cameras, for example, one for still images and one for video, or one front and one back. The camera I/F 167 may be adapted to support CCIR 601 (YUV 4:2:0) video source and raw image sensor AFE chip inputs, with images sizes up to eight megapixels. The camera I/F 167 may also support windowing and sub-sampling in YUV and/or in raw modes.

The display controller 169 may comprise suitable circuitry and/or logic and may be connected to a range of TFT LCDs or may be used to drive the internal TV Out function. The display controller 169 may support a range of screen buffer formats, and may utilize DMA to access the buffer directly, removing any processor overhead. Screen buffer sizes may be any size up to XGA, and the display controller 169 may be adapted to automatically scale this up or down onto an output raster that may be any size up to SXGA. Both NTSC and PAL raster formats may be generated by the display controller 169 for driving the TV Out functionality. The pins for the secondary memory interface may instead be used to connect a direct drive LCD. Fully programmable strobe and porch timing, as well as 7 bits/pixel color scheme, may be supported by the display controller 169. The display controller 169 may be adapted to read data from a screen buffer via DMA, and may produce pixel and synchronization signals that may be utilized to drive the internal TV Out block, or an external LCD. The display controller 169 may also be adapted to scale the output data on the fly, allowing the size of the screen buffer to reflect the picture resolution rather than the desired screen size.

In an exemplary aspect of the invention, the display controller 169 may be adapted to generate control signal for an on-chip DMA controller 198 and may instruct the DMA controller 198 to acquire interlaced and/or non-interlaced decoded video data in accordance with the type of display device that may be connected to the mobile multimedia processor 141. The TV output interface 171 and the TV output converter 173 may utilize standard NTSC or PAL raster acquired from the display controller 169 and may be adapted to generate either a composite video or S-video output to feed into a TV, for example. The USB interface 175 may support USB slave connection. The USB PHY layer interface 177 may be utilized to reduce USB system size, cost and power consumption. The $I^2C$ controller 179 may be utilized to control image sensors and/or to connect to smart batteries and other peripherals.

The SPI peripheral 181 may be utilized by image sensors or other peripherals. Two chip selects may be provided, and the interface may be adapted to work in polled mode, with interrupts, or via the DMA controller 198. The UART 183 may comprise a standard 16550 UART, supporting baud rates up to about 921,600. The AC'97 and $I^2S$ controller 185 may be adapted to provide AC'97 and/or $I^2S$ audio output in either master or slave mode. AC'97 audio input may also be supported. The controller 185 may comprise independent transmit and/or receive FIFOs, and may utilized the DMA controller 198 to further reduce processor overhead. Accurate bit clocks may be generated by one of the on-chip PLLs without compromising the frequency requirements of the clocks for the core or other peripherals.

The PCM audio interface 187 may comprise suitable circuitry, logic, and/or code and may allow input and/or output of telephony or high quality stereo audio, as well as the classic PCM and I²S formatted-output signals. The interface 187 may comprise independent transmit and/or receive FIFOs, and may utilize DMA to further reduce processor overhead. The memory stick interface 189 may comprise a Sony Memory Stick Pro™ Host, allowing seamless connection to Memory Stick and Memory Stick Pro devices. The SD Card interface 191 may allow connection to SD, xD Card or variants thereof, MMC and/or SDIO devices. Both 1-bit and 4-bit transfers may be supported by the interface 191, and DMA may be used to move the data to or from on-chip memory.

The on-chip debug module 193 may be accessed via the JTAG controller 195. The debug module 193 may provide access to all of the address space of the mobile multimedia processor 141 and control of the processor core 143, as well as additional features, such as breakpoints and codeprofiling. The embedded JTAG controller 195 may utilize direct access to the scalar processing unit 144, the vector processing unit 142 and/or the memory controller 197, allowing it to snoop on major buses within the processor core 143. Such tight integration may provide memory and register access, control over program execution, run to breakpoint, setting of break conditions, single stepping and/or code profiling. A built-in program and data trace buffer may allow examination of program state after a breakpoint or exception.

The peripheral bus 196 may comprise the AMBA™ (Advanced Microcontroller Bus Architecture) to connect the peripheral control/status registers to the memory controller 197. The external memory interface 151, camera interface 167, bitstream peripherals, host interfaces, USB device controller 175, and display controller 169 may be attached to the Advanced High-performance Bus (AHB) 196a. The AHB 196a may pass through a simple bridge to the lower-speed Advanced Peripheral Bus (APB) 196b through which the rest of the peripheral control/status registers may be accessed.

The memory controller 197 may comprise suitable circuitry, logic, and/or code and may be utilized for servicing all memory requests within the mobile multimedia processor 141. The memory controller 197 may be adapted to perform address decoding, may arbitrate between the different bus masters, may maintain data cache coherence, and may handle DMA transfers.

The DMA controller 198 may be utilized to transfer data between peripherals and memory, independently of the vector processing unit 142 and the scalar processing unit 144. The DMA controller 198 may comprise dedicated wide and narrow data ports to the memory controller 197, and may seamlessly interface sources and destinations of different widths. The DMA controller 198 may comprise 16 sub-channels that may be grouped into a plurality of channels. Each channel may be associated with one of a plurality of system peripherals. The DMA controller 198 may be adapted to support 2-dimensional DMA, allowing windowed images or non-consecutive data items to be transferred. In this regard, the DMA controller 198 may be adapted to fetch non-consecutive processed video data from memory for display by one or more external displays communicatively coupled to the mobile multimedia processor 141. For example, the DMA controller 198 may be adapted to fetch interlaced or non-interlaced video data for display on an interlaced or non-interlaced display. Furthermore, the DMA controller 198 may be adapted to skip one or more video lines between fetched video lines so that scaling or other video processing may be achieved without redundant use of stored video data.

Figure 2:
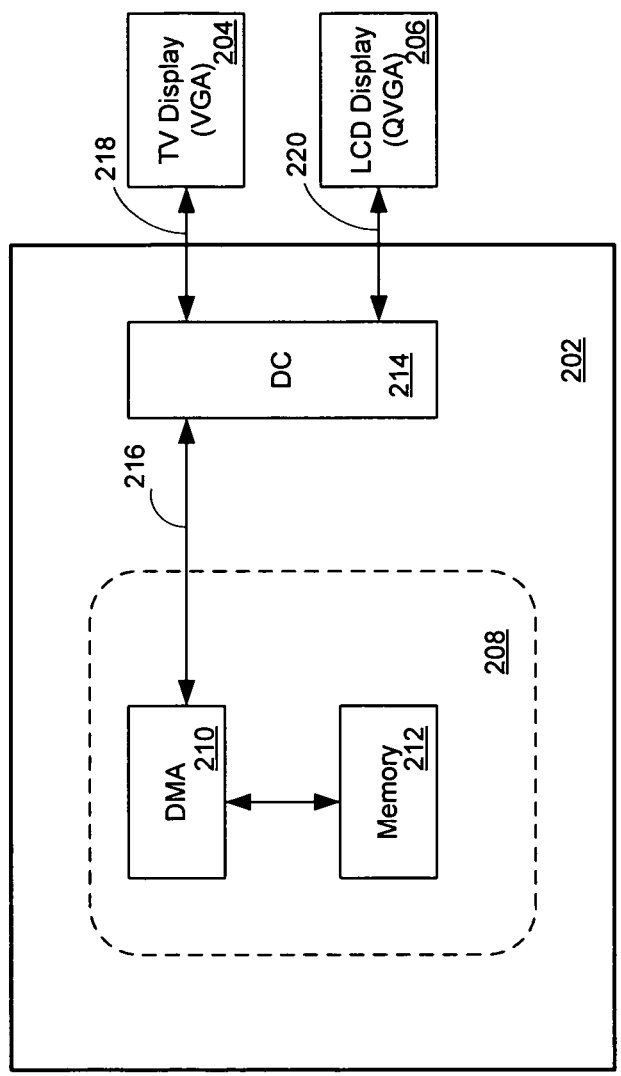
FIG. 2 is a functional block diagram of an intelligent DMA in a mobile multimedia processor supporting interlaced and non-interlaced video displays with a single display controller, in accordance with an embodiment of the invention.

FIG. 2 is a functional block diagram of an intelligent DMA in a mobile multimedia processor supporting interlaced and non-interlaced video displays with a single display controller, in accordance with an embodiment of the invention. Referring to FIG. 2, the mobile multimedia processor 202 may comprise a processor core 208 and a display controller (DC) 214. The processor core 208 may comprise a direct memory access (DMA) controller 210 and on-chip memory 212. The display controller 214 may be adapted to support a TV display 204 and/or an LCD display 206.

The DMA controller 210 may comprise suitable circuitry and/or logic and may be adapted to acquire decoded video information stored in memory 212 and communicate the acquired video information to the DC 214. In an exemplary aspect of the invention, the DMA controller 210 may be adapted, or programmed, to recognize a determined amount of decoded video information. For example, the DMA controller 210 may be adapted to recognize an entire pixel line of decoded video information. In this regard, a single on-chip memory 212 may be utilized for storing decoded video information for both interlaced and non-interlaced displays. Further, the DMA controller 210 may be adapted to skip a pixel line and go forward or backward by at least one line, as instructed by the DC 214 during a video scaling and/or zooming operations, for example.

The DC 214 may comprise suitable circuitry and/or logic and may be adapted to request interlaced and/or non-interlaced video information from the DMA controller 210 for communication to one or more displays, such as the TV display 218 and the LCD display 220. In one aspect of the invention, the DC 214 may be adapted to recognize whether a display connected to the mobile multimedia processor 202 is an interlaced display or a non-interlaced display. Depending on whether a connected display is an interlaced or non-interlaced display, the DC 214 may instruct the DMA via the connection 216 to acquire interlaced or non-interlaced video information.

In operation, if the DC 214 requests video information for the interlaced TV display 204, the DMA 210 may access the on-chip memory 212 and may initially acquire decoded video information from all odd-numbered pixel lines, followed by decoded video information from all even-numbered pixel lines. The acquired interlaced video information may be communicated from the DMA 210 to the DC 214 via connection 216, and from the DC 214 to the TV display 204 via connection 218.

Similarly, if the DC 214 requests video information for the non-interlaced LCD display 206, the DMA 210 may access the on-chip memory 212 and may acquire decoded video information in a sequential line fashion. The acquired non-interlaced video information may be communicated from the DMA 210 to the DC 214 via connection 216, and from the DC 214 to the LCD display 206, via connection 220.

In another aspect of the invention, the DC 214 may be adapted to support interlaced and non-interlaced mode simultaneously. Accordingly, an interlaced video display and a non-interlaced video display may be simultaneously coupled to the mobile multimedia processor 202 and may simultaneously request interlaced and non-interlaced video information, respectively, from the DC 214. The DC 214 may be adapted to generate corresponding instructions and acquire interlaced and non-interlaced video information from the on-chip memory 212 via the DMA controller 210.

Figure 3:
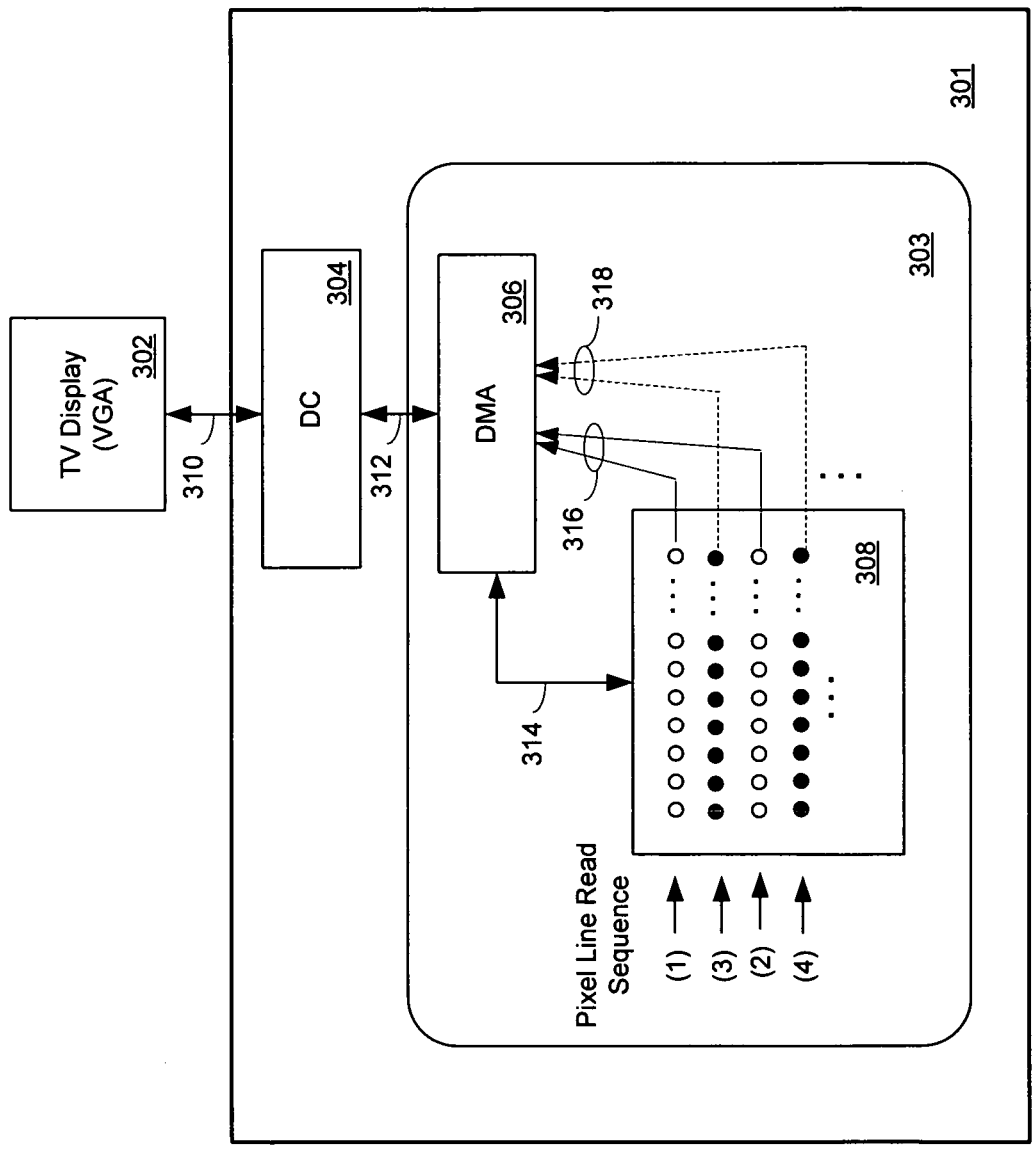
FIG. 3 is a functional block diagram of memory utilization by an intelligent DMA in a mobile multimedia processor supporting an interlaced video display, in accordance with an embodiment of the invention.

FIG. 3 is a functional block diagram of memory utilization by an intelligent DMA in a mobile multimedia processor supporting an interlaced video display, in accordance with an embodiment of the invention. Referring to FIG. 3, the mobile multimedia processor 301 may comprise a processor core 303 and a display controller (DC) 304. The processor core 303 may comprise a direct memory access (DMA) controller 306 and on-chip memory 308. The display controller 304 may be adapted to support an interlaced video display, such as a TV display 302.

The DMA controller 306 may comprise suitable circuitry and/or logic and may be adapted to acquire decoded video information stored in memory 308 and communicate the acquired video information to the DC 304 via connection 312. In an exemplary aspect of the invention, the DMA controller 306 may be adapted, or programmed, to recognize a determined amount of decoded video information. For example, the DMA controller 306 may be adapted to recognize an entire pixel line of decoded video information stored in the on-chip memory 308. Further, the DMA controller 306 may be adapted to skip a pixel line and/or go forward or backward a line, as instructed by the DC 304 during a video scaling and/or zooming operations, for example. The DC 304 may comprise suitable circuitry and/or logic and may be adapted to request interlaced video information from the DMA controller 306 for communication to the TV display 302.

In one aspect of the invention, the DC 304 may be adapted to recognize whether a display connected to the mobile multimedia processor 301 is an interlaced display or a non-interlaced display. In operation, since the display 302 comprises an interlaced display, the DC 304 may instruct the DMA 306 via the connection 312 to acquire interlaced video information. The DMA 306 may then access the on-chip memory 308 via the connection 314 and may initially acquire decoded video information from all odd-numbered pixel lines 316, followed by decoded video information from all even-numbered pixel lines 318. Accordingly, the pixel line reading sequence for pixel lines stored in the memory 308 may be as follows: line 1, line 3, line 5, etc., followed by line 2, line 4, line 6, etc. The acquired interlaced video information may be communicated from the DMA 306 to the DC 304 via connection 312, and from the DC 304 to the TV display 302 via connection 310.

Figure 4:
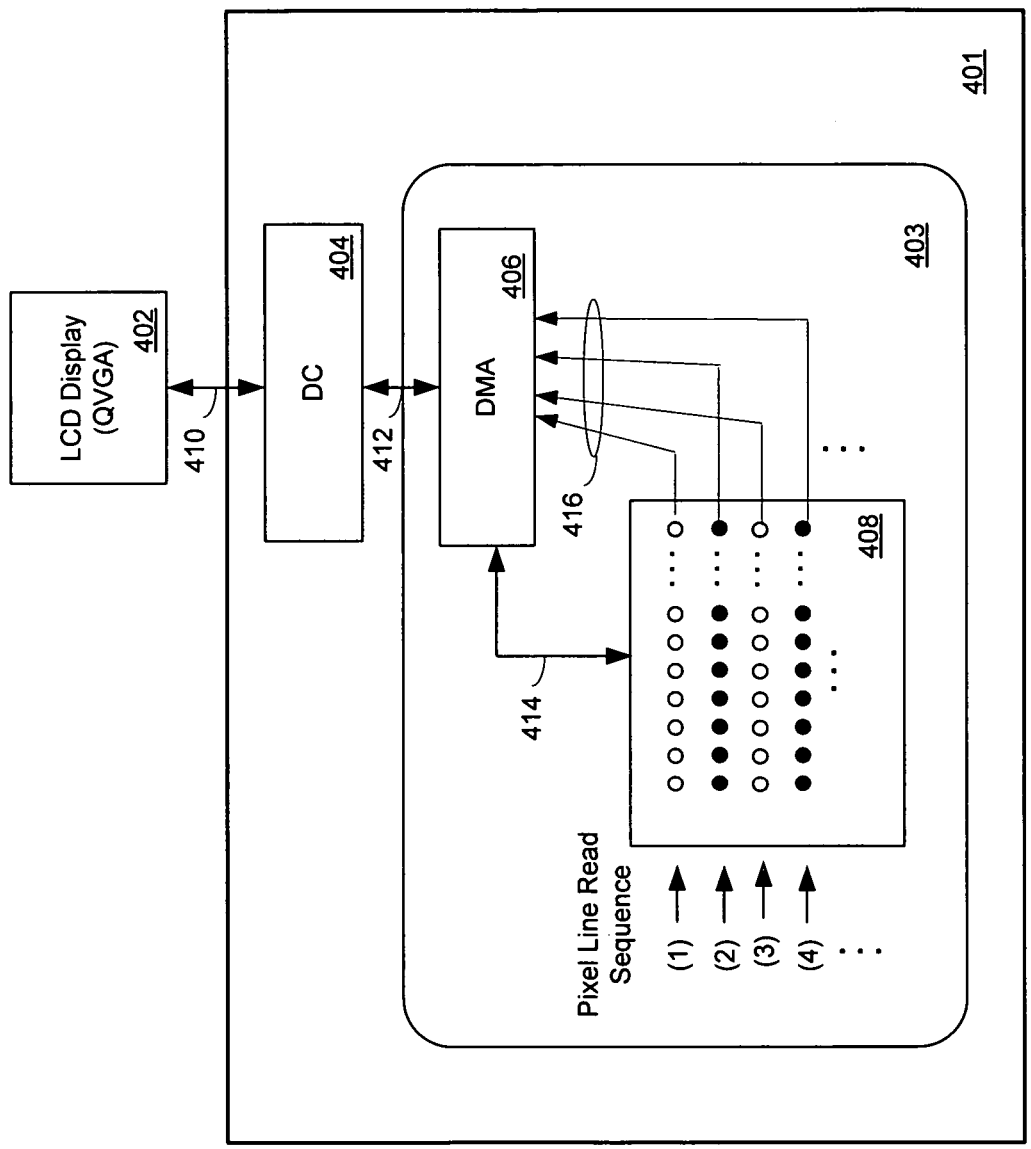
FIG. 4 is a functional block diagram of memory utilization by an intelligent DMA in a mobile multimedia processor supporting a non-interlaced video display, in accordance with an embodiment of the invention.

FIG. 4 is a functional block diagram of memory utilization by an intelligent DMA in a mobile multimedia processor supporting a non-interlaced video display, in accordance with an embodiment of the invention. Referring to FIG. 4, the mobile multimedia processor 401 may comprise a processor core 403 and a display controller (DC) 404. The processor core 403 may comprise a direct memory access (DMA) controller 406 and on-chip memory 408. The display controller 404 may be adapted to support a non-interlaced video display, such as an LCD display 402.

The DMA controller 406 may comprise suitable circuitry and/or logic and may be adapted to acquire decoded video information stored in memory 408 and communicate the acquired video information to the DC 404 via connection 412. In an exemplary aspect of the invention, the DMA controller 406 may be adapted, or programmed, to recognize a determined amount of decoded video information. For example, the DMA controller 406 may be adapted to recognize an entire pixel line of decoded video information stored in the on-chip memory 408. Furthermore, the DMA controller 406 may be adapted to skip a pixel line and/or go forward or backward a line, as instructed by the DC 404 during a video scaling and/or zooming operations, for example. The DC 404 may comprise suitable circuitry and/or logic and may be adapted to request non-interlaced video information from the DMA controller 406 for communication to the LCD display 402.

In one aspect of the invention, the DC 404 may be adapted to recognize whether a display connected to the mobile multimedia processor 401 is an interlaced display or a non-interlaced display. In operation, since the display 402 comprises a non-interlaced display, the DC 404 may instruct the DMA 406 via the connection 412 to acquire non-interlaced video information stored in the on-chip memory 408. The DMA 406 may then access the on-chip memory 408 via the connection 414 and may acquire decoded video information from sequential pixel lines 416. Accordingly, the pixel line reading sequence for pixel lines stored in the on-chip memory 408 may be as follows: line 1, line 2, line 3, line 4, etc. The acquired non-interlaced video information may be communicated from the DMA 406 to the DC 404 via connection 412, and from the DC 404 to the LCD display 402 via connection 410.

Figure 5:
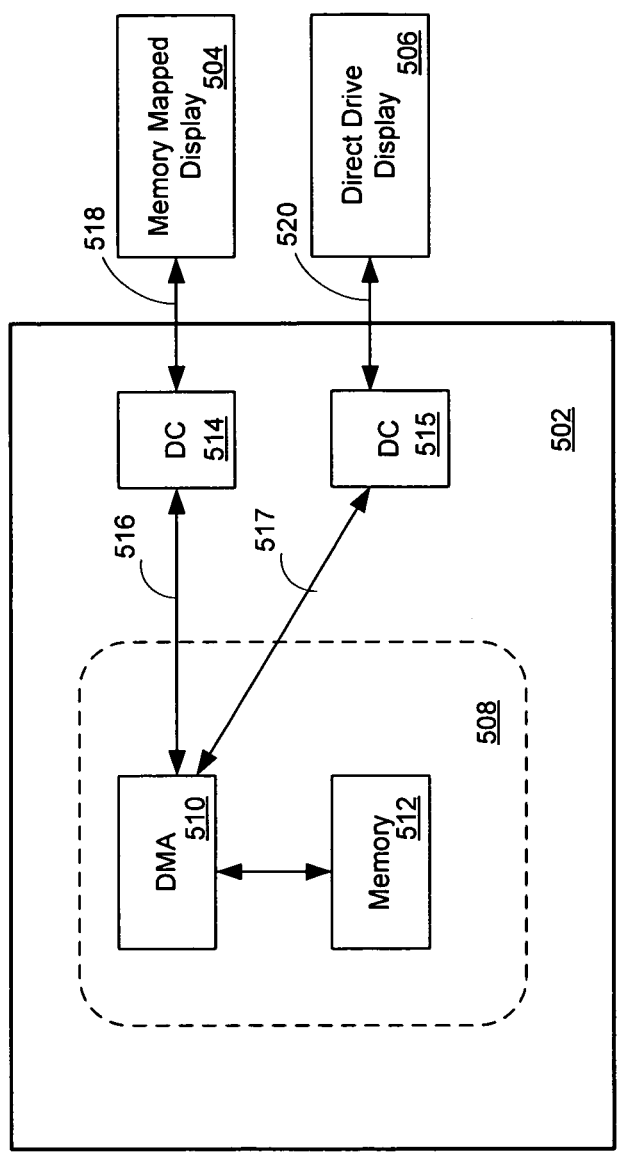
FIG. 5 is a functional block diagram of an intelligent DMA in a mobile multimedia processor supporting interlaced and non-interlaced video displays with two display controllers, in accordance with an embodiment of the invention.

FIG. 5 is a functional block diagram of an intelligent DMA in a mobile multimedia processor supporting interlaced and non-interlaced video displays with two display controllers, in accordance with an embodiment of the invention. Referring to FIG. 5, the mobile multimedia processor 502 may comprise a processor core 508 and display controllers (DC) 514 and 515. The processor core 508 may comprise a direct memory access (DMA) controller 510 and on-chip memory 512. In an exemplary aspect of the invention, the mobile multimedia processor 502 may utilize two display controllers 514 and 515 adapted to handle a memory mapped display and a direct drive display, respectively. For example, the display controller 514 may be adapted to support a memory mapped display 504 via the connection 518, and the display controller 515 may be adapted to support a direct drive display 506 via the connection 520. The memory mapped display 504 may be adapted to utilize interlaced or non-interlaced video information and may refresh only after new video information is stored in memory. The direct drive display 508 may be adapted to utilize interlaced video information and may constantly refresh at the rate of 60 Hz, for example.

The DMA controller 510 may comprise suitable circuitry and/or logic and may be adapted to acquire decoded video information stored in memory 512 and communicate the acquired video information to the DC 514 or DC 515. In an exemplary aspect of the invention, the DMA controller 510 may be adapted, or programmed, to recognize a determined amount of decoded video information. For example, the DMA controller 510 may be adapted to recognize an entire pixel line of decoded video information. In this regard, a single on-chip memory 512 may be utilized for storing decoded video information for both interlaced and non-interlaced displays. Further, the DMA controller 510 may be adapted to skip a pixel line and go forward or backward a line, as instructed by the DC 514 or DC 515 during a video scaling and/or zooming operations, for example. The DC 514 and 515 may comprise suitable circuitry and/or logic and may be adapted to request interlaced and/or non-interlaced video information from the DMA controller 510 for communication to one or more displays, such as the memory mapped display 504 and the direct drive display 506.

In operation, the DC 514 and 515 may be adapted to recognize whether a display connected to the mobile multimedia processor 502 is an interlaced display or a non-interlaced display. Depending on whether a connected display is an interlaced or non-interlaced display, the DC 514 and 515 may instruct the DMA 510 via the connections 516 and 517, respectively, to acquire interlaced or non-interlaced video information.

For example, if the DC 515 requests video information for the interlaced direct drive display 506, the DMA 510 may access the on-chip memory 512 and may initially acquire decoded video information from all odd-numbered pixel lines, followed by decoded video information from all even-numbered pixel lines. The acquired interlaced video information may be communicated from the DMA 510 to the DC 515 via connection 517, and from the DC 515 to the direct drive display 506 via connection 520.

Similarly, if the DC 514 requests non-interlaced video information for the memory mapped display 505, the DMA 510 may access the on-chip memory 512 and may acquire decoded video information in a non-interlaced, sequential line fashion. The acquired non-interlaced video information may be communicated from the DMA 510 to the DC 514 via connection 516, and from the DC 514 to the memory mapped display 504 via connection 518.

Figure 6:
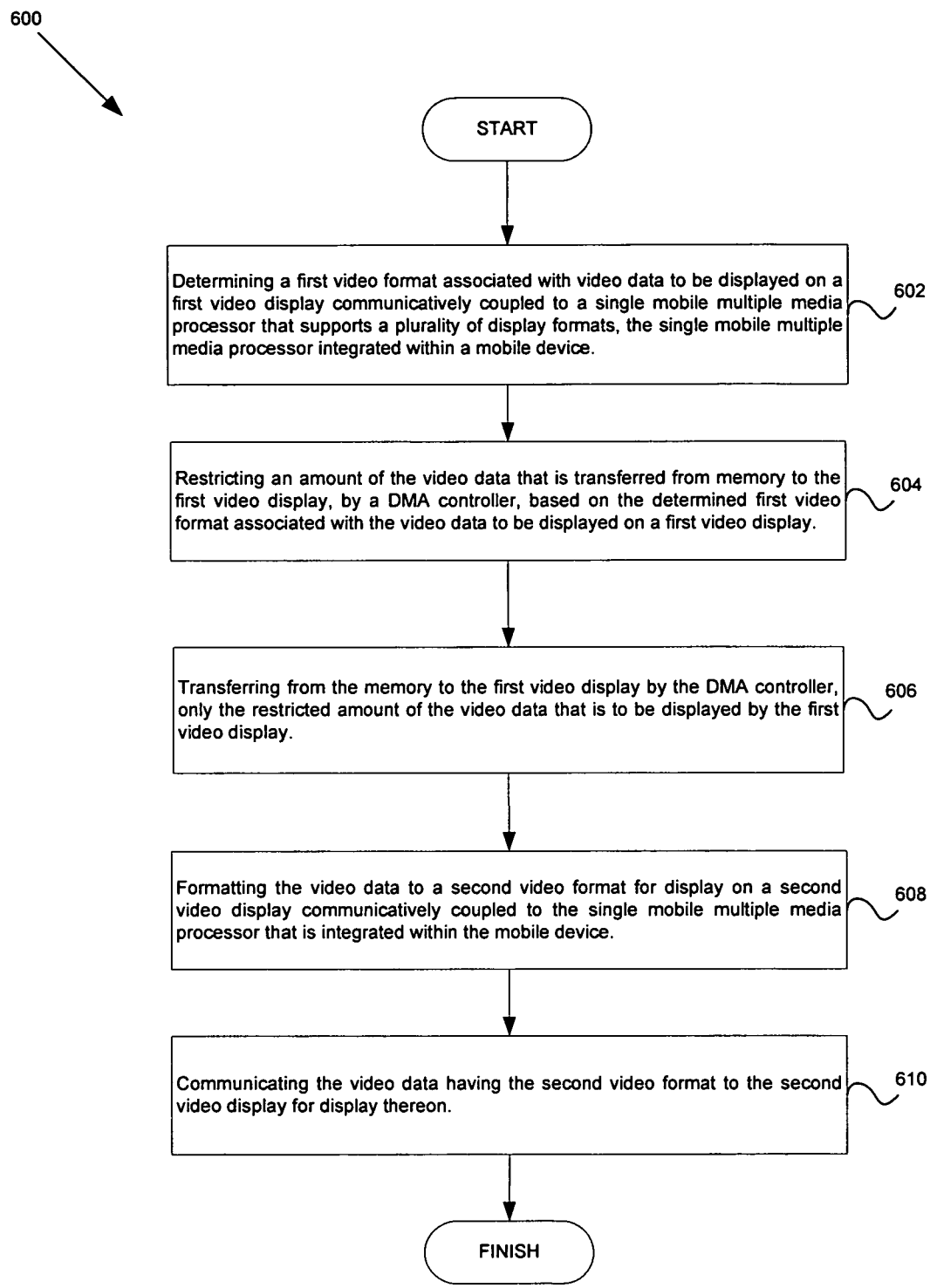
FIG. 6 is a flow diagram illustrating exemplary steps for processing video data, in accordance with an embodiment of the invention.

FIG. 6 is a flow diagram illustrating exemplary steps for processing video data, in accordance with an embodiment of the invention. Referring to FIG. 6, at 602, a first video format associated with video data to be displayed on a first video display communicatively coupled to a single mobile multiple media processor that supports a plurality of display formats may be determined. The single mobile multiple media processor may be integrated within a mobile device. At 604, an amount of the video data that is transferred from memory to the first video display, by a DMA controller, may be restricted based on the determined first video format associated with the video data to be displayed on a first video display. At 606, only the restricted amount of the video data that is to be displayed by the first video display may be transferred from the memory to the first video display by the DMA controller. At 608, the video data may be formatted to a second video format for display on a second video display communicatively coupled to the single mobile multiple media processor that is integrated within the mobile device. At 610, the video data having the second video format may be communicated to the second video display for display thereon.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods descry bed herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video data, the method comprising:
   determining a first display format associated with video data to be displayed on a first video display communicatively coupled to a single mobile multimedia processor that supports a plurality of display formats;
   determining a second display format associated with a second video display communicatively coupled to the single mobile multimedia processor, said single mobile multimedia processor integrated within a mobile device;
   recognizing a pixel line of decoded video information stored in a memory;
   moving in the memory by one or more pixel lines based on the first video format and the second display format
   restricting an amount of said video data that is transferred from memory to said first video display, by a DMA controller, based on said determined first display format associated with said video data to be displayed on a first video display; and
   transferring from said memory to said first video display by said DMA controller, only said restricted amount of said video data that is to be displayed by said first video display.

2. The method according to claim 1, comprising formatting said video data to a second display format for display on a second video display communicatively coupled to said single mobile multimedia processor that is integrated within said mobile device.

3. The method according to claim 2, comprising communicating said video data having said second display format to said second video display for display thereon.

4. The method according to claim 2, wherein said first display format and said second display format is one of: an interlaced video display format, a non-interlaced video display format, and a scaled video display format.

5. The method according to claim 2, comprising, if said first display format or said second display format comprises an interlaced video display format, formatting said video data to said interlaced video display format.

6. The method according to claim 2, comprising, if said first display format or said second display format comprises a non-interlaced video display format, formatting said video data to said non-interlaced video display format.

7. The method according to claim 1, comprising formatting said video data to a second display format for simultaneous display on a second video display that is simultaneously communicatively coupled along with said first video display to said single mobile multimedia processor that is integrated within said mobile device.

8. The method according to claim 1, comprising acquiring said video data from one or both of: an on-chip memory integrated within said single mobile multimedia processor and/or an off-chip memory.

9. The method according to claim 1, wherein the moving by one or more pixel lines comprises moving forward by one or more pixel lines.

10. The method according to claim 1, wherein the moving by one or more pixel lines comprises moving backward by one or more pixel.

11. The method according to claim 1, wherein the moving by one or more pixel lines occurs during a video scaling operation.

12. A system for processing video data, the system comprising:
    at least one first processor that determines a first display format associated with video data to be displayed on a first video display communicatively coupled to a single mobile multimedia processor that supports a plurality of display formats;

at least one second processor that determines a second display format associated with video data to be displayed on a second video display communicatively coupled to the single mobile multimedia processor, said single mobile multimedia processor integrated within a mobile device; and a direct memory access (DMA) controller being configured to recognize a pixel line of decoded video information stored in an on-chip memory and move by one or more pixel lines in the on-chip memory based on the first video format and the second video format.

13. The system according to claim 12, wherein said DMA controller transfers from said memory to said first video display, only said restricted amount of said video data that is to be displayed by said first video display.

14. The system according to claim 13, wherein said at least one processor scales said video data for display on said first video display or said second video display, if said first display format or said second display format comprises a scaled video display format.

15. The system according to claim 12, wherein the DMA controller formats said video data to a second display format for display on a second video display communicatively coupled to said single mobile multimedia processor that is integrated within said mobile device.

16. The system according to claim 15, wherein said at least one processor communicates said video data having said second display format to said second video display for display thereon.

17. The system according to claim 12, wherein said at least one processor formats said video data to a second display format for simultaneous display on a second video display that is simultaneously communicatively coupled along with said first video display to said single mobile multimedia processor that is integrated within said mobile device.

18. The system according to claim 12, wherein a first display controller is in communication with the DMA controller, the first display controller being configured to provide instructions to the DMA controller to move forward or backward by one or more pixel lines during a video scaling operation.

19. The system according to claim 12, wherein the DMA controller is configured to read each odd line of the video data followed by each even pixel line of the video data.

20. A method for processing video data for display, the method comprising:

determining a first display format for video data to be displayed on a first video display communicatively coupled to a single mobile multimedia processor that is integrated within a handheld device;

determining a second display format for video data to be displayed on a second video display simultaneously communicatively coupled to said single mobile multimedia processor that is integrated within said handheld device;

transferring video data having said first display format to said first video display communicatively coupled to said single mobile multimedia processor;

recognizing, by a direct memory access (DMA) controller, a pixel line of decoded video information stored in an on-chip memory;

moving forward in the on-chip memory by more than one pixel lines based on the first video format;

simultaneously transferring video data having said second display format to said second video display communicatively coupled to said single mobile multimedia processor.

21. The method according to claim 20, wherein said transferring video data having said first display format to said first video display occurs via a DMA transfer.

22. The method according to claim 20, wherein said transferring video data having said second display format to said second video display occurs via a DMA transfer.

* * * * *